US012556035B2

(12) United States Patent
Seth et al.

(10) Patent No.: US 12,556,035 B2
(45) Date of Patent: Feb. 17, 2026

(54) WIRELESS CHARGER WITH VENTING SYSTEM

(71) Applicant: Molex, LLC, Lisle, IL (US)

(72) Inventors: Christian Seth, Zossen (DE);
Alexander Griesche, Zossen (DE);
Ronald Heldt, Gross Machnow (DE);
Reinhold Reif, Schwaig (DE)

(73) Assignee: Molex, LLC, Lisle, IL (US)

( * ) Notice: Subject to any disclaimer, the term of this patent is extended or adjusted under 35 U.S.C. 154(b) by 701 days.

(21) Appl. No.: 17/896,074

(22) Filed: Aug. 26, 2022

(65) Prior Publication Data

US 2023/0074238 A1 Mar. 9, 2023

Related U.S. Application Data

(60) Provisional application No. 63/240,162, filed on Sep. 2, 2021.

(51) Int. Cl.
*H01M 10/46* (2006.01)
*H02J 7/00* (2006.01)
*H02J 50/00* (2016.01)
*H02J 50/10* (2016.01)
*H02J 50/40* (2016.01)
*H05K 7/20* (2006.01)

(52) U.S. Cl.
CPC .......... *H02J 50/005* (2020.01); *H02J 7/0044* (2013.01); *H02J 50/10* (2016.02); *H02J 50/402* (2020.01); *H05K 7/20145* (2013.01)

(58) Field of Classification Search
CPC ........ H02J 50/005; H02J 50/10; H02J 50/402; H02J 7/0044; H02J 7/0042; H02J 7/00309; H05K 7/20145

USPC .......................... 320/108, 114, 115, 150, 153
See application file for complete search history.

(56) References Cited

U.S. PATENT DOCUMENTS

| | | | |
|---|---|---|---|
| 2014/0062392 A1* | 3/2014 | Lofy | H05K 7/20136 320/108 |
| 2019/0223329 A1 | 7/2019 | Moon et al. | |
| 2021/0185854 A1 | 6/2021 | Sui et al. | |
| 2021/0345520 A1* | 11/2021 | Los | H01F 27/38 |
| 2021/0391734 A1* | 12/2021 | Selby | H02J 7/00309 |
| 2022/0256732 A1 | 8/2022 | Wu et al. | |

FOREIGN PATENT DOCUMENTS

| | | | | |
|---|---|---|---|---|
| CN | 113036838 A | 6/2021 | | |
| WO | WO-2019085839 A1 * | 5/2019 | | H02J 50/005 |
| WO | 2021109803 A1 | 6/2021 | | |

* cited by examiner

*Primary Examiner* — Edward Tso (57) ABSTRACT

A wireless charging module includes a housing configured to support at least one coil module therein. The housing includes an upper housing portion and a lower housing portion. The upper housing portion includes at least one vent. The lower housing portion includes at least one vent. One or more ducts are provided within the housing. The one or more ducts are in communication with the at least one vent of the upper housing portion and the at least one vent of the lower housing portion. An airflow path is defined from the at least one vent of the upper housing portion through the one or more ducts to the at least one vent of the lower housing portion for allowing an air flow internally within the housing generally around and/or adjacent at least a portion of the at least one coil module supported within the housing.

20 Claims, 4 Drawing Sheets

WIRELESS CHARGER WITH VENTING SYSTEM

RELATED APPLICATIONS

This application claims priority to U.S. Provisional Patent Application Ser. No. 63/240,162 filed Sep. 2, 2021, which is incorporated herein by reference in its entirety.

TECHNICAL FIELD

This disclosure relates to the field of wireless charging, more specifically to wireless charging of a mobile device in a vehicle.

DESCRIPTION OF RELATED ART

Wireless charging is known to be an effective and simple way, at least for the consumer, to charge a mobile device. A conventional wireless charger includes a housing and a transmit (Tx) coil within the housing. The Tx coil is configured to couple to a receive (Rx) coil of a mobile device when placed adjacent the Tx coil. When the Tx and Rx coils are coupled together, a time-varying magnetic field is provided on the Rx coil that induces a current, which, in turn, can charge a battery in the mobile device.

SUMMARY

This section provides a general summary of the disclosure and is not a comprehensive disclosure of its full scope or all of its features.

Exemplary embodiments are disclosed of wireless charging modules configured to include cooling features. In an exemplary embodiment, a wireless charging module includes a housing configured to support at least one coil module therein. The housing includes an upper housing portion and a lower housing portion. The upper housing portion includes at least one vent. The lower housing portion includes at least one vent. One or more ducts are provided within the housing. The one or more ducts are in communication with the at least one vent of the upper housing portion and the at least one vent of the lower housing portion. An airflow path is defined from the at least one vent of the upper housing portion through the one or more ducts to the at least one vent of the lower housing portion for allowing an air flow internally within the housing generally around and/or adjacent at least a portion of the at least one coil module supported within the housing.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present application is illustrated by way of example and not limited in the accompanying figures in which like reference numerals indicate similar elements and in which.

DETAILED DESCRIPTION OF THE PREFERRED EMBODIMENTS

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

15 Watt (15 W) automotive wireless chargers are used for charging mobile devices (e.g., mobile phones, etc.) in vehicles. Advantageously, 15 W automotive wireless chargers allow for faster charging and shorter charging times of mobile devices. But the faster charging and reduced charging times may be associated with overheating and increased temperatures of the 15 W wireless chargers and mobile devices. After recognizing the above heating concerns, exemplary embodiments were developed and/or are disclosed herein of wireless charging modules configured to include cooling features.

Figure 1:
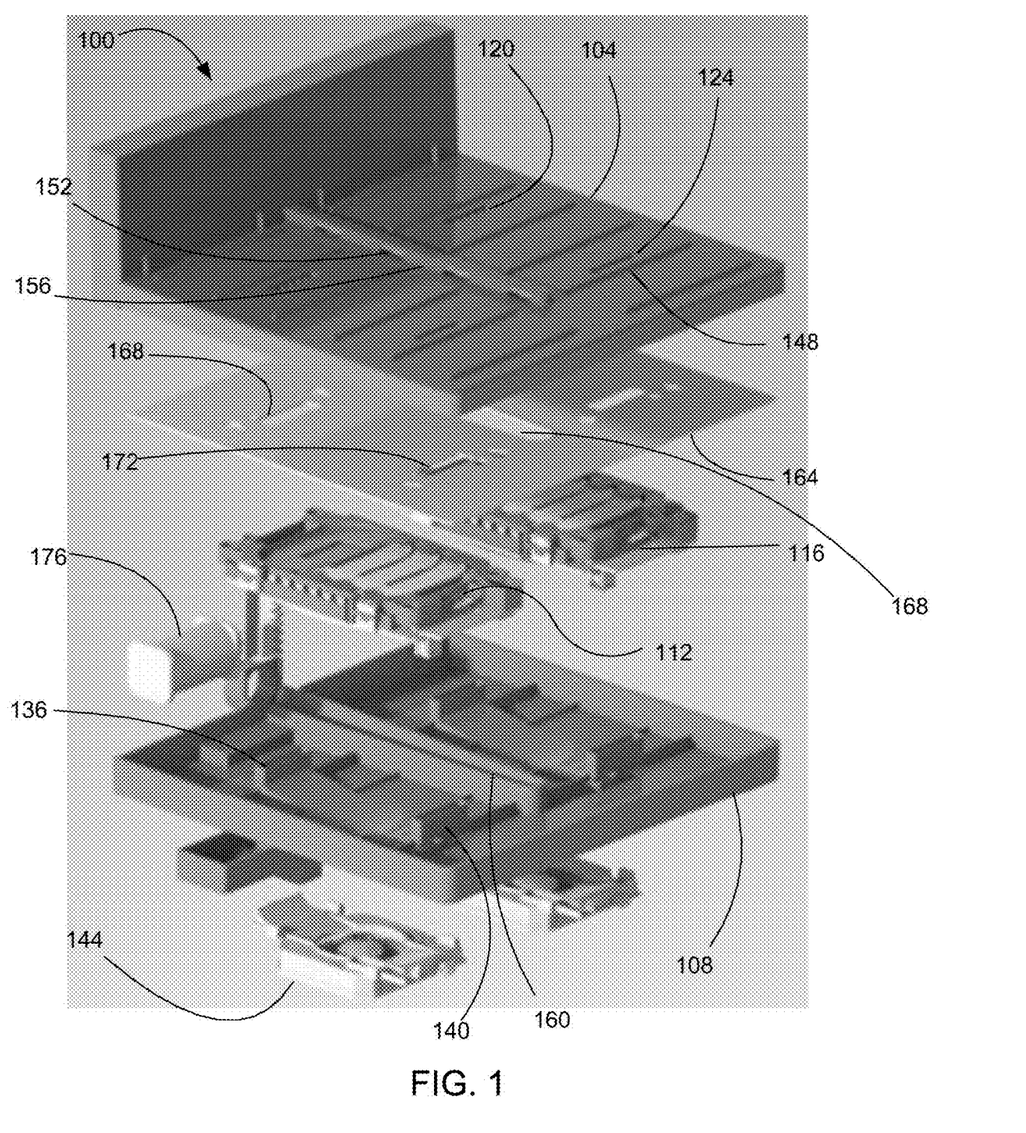
FIG. 1 is an exploded perspective view of a wireless charging module according to an exemplary embodiment of the present disclosure.
Figure 2:
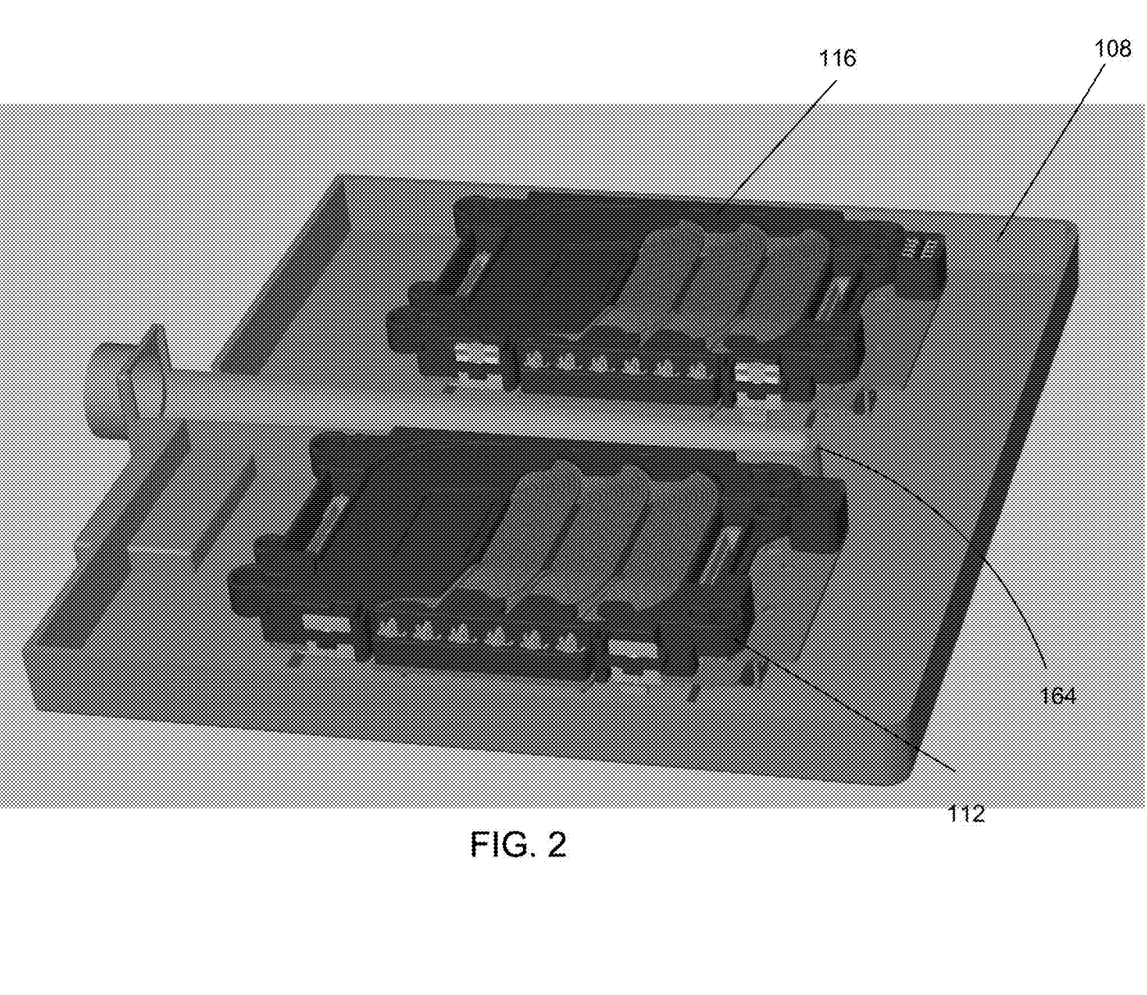
FIG. 2 is a perspective view illustrating the transmit (Tx) coil modules assembled to and supported by the lower housing portion of the wireless charging module shown in FIG. 1.
Figure 3:
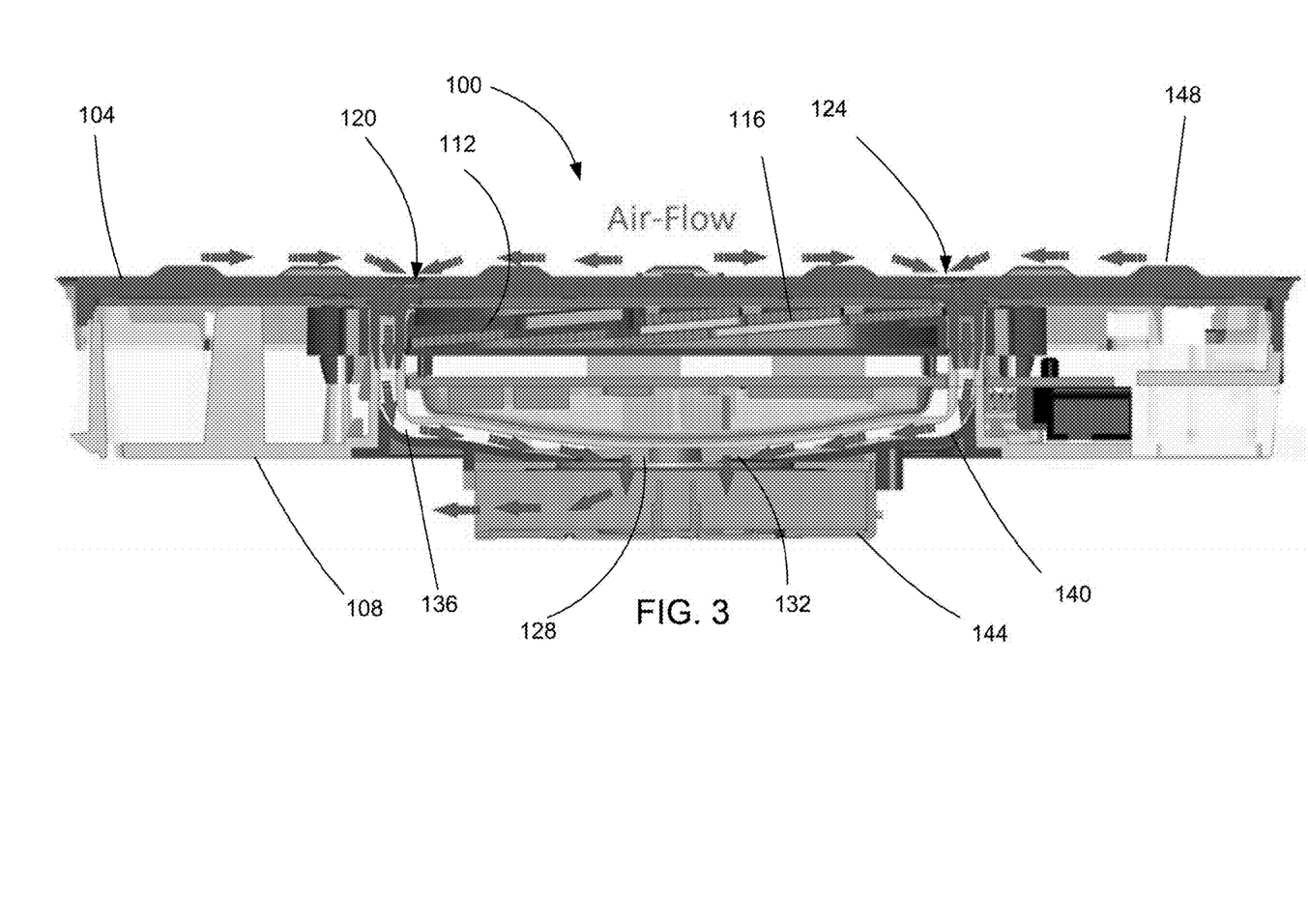
FIG. 3 is a cross-sectional view of the wireless charging module shown in FIG. 1 after being assembled. Arrows represent a cooling airflow across the upper housing portion and internally within ductwork (e.g., a plurality of air passageways or ducts, etc.) provided in (e.g., integrally defined by, etc.) the housing generally around and/or adjacent at least a portion of at least one coil module supported within the housing.

With reference now to the figures, FIGS. 1 through 3 illustrate a wireless charging module 100 according to an exemplary embodiment of the present disclosure. The wireless charging module 100 includes upper and lower housing portions 104, 108 configured to be coupled together such that an interior compartment is cooperatively defined between the upper and lower housing portions 104, 108. The housing interior compartment is configured for supporting first and second coil modules 112, 116 therein. See, for example, FIG. 2 in which the first and second coil modules 112, 116 are shown assembled to and supported by the lower housing portion 108 of the wireless charging module 100.

As shown in FIG. 3, the wireless charging module 100 is configured to provide a cooling airflow (as indicated by arrows) across the upper housing portion 104 (e.g., to flow across at least one surface of a mobile device placed on the upper housing portion 104, etc.) and internally within the housing generally around and/or adjacent at least portions of the first and second coil modules 112, 116. As shown in FIG. 3, the upper housing portion 104 includes (e.g., integrally defines, etc.) air inlets or vents 120, 124. And the lower housing portion 108 includes (e.g., integrally defines, etc.) air outlets or vents 128, 132. Air passageways or ducts 136, 140 are provided within (e.g., integrally defined by, etc.) the housing that are in communication with the air inlets 120, 124 and the air outlets 128, 132. At least one fan 144 is in communication with the ducts 136, 140 via the air outlets 128, 132. The fan 144 is operable for generating an air flow (represented by arrows) into the air inlets 120, 124 through the ducts 136, 140 generally around the first and second coil modules 112, 116 to the air outlets 128, 132.

In this exemplary embodiment, the upper housing portion 104 includes (e.g., integrally defines, injection molded, etc.) upwardly protruding portions 148 spaced apart along the upper housing portion 104 as shown in FIGS. 1 and 3. The upwardly protruding portions 148 are configured to allow air to pass underneath a mobile device that has been placed atop the upwardly protruding portions 148 for wireless charging by the wireless charging module 100, and thereafter be drawn into the air inlets or vents 120, 124 of the upper housing portion 104.

By way of example, the upwardly protruding portions 148 may comprise ribs that extend laterally across or along a width of the upper surface portion 104 as shown in FIG. 1. The ribs have a generally trapezoidal cross-sectional shape or profile (e.g., isosceles trapezoid including congruent base angles and congruent non-parallel sides, etc.) as shown in FIG. 3. The ribs may have a height of about 1 millimeter. But this 1 millimeter height dimension and trapezoidal shape for the ribs are example in nature and do not limit the scope of the present disclosure. In alternative embodiments, a wireless charging module may include an upper housing portion with upwardly protruding portions that are configured differently (e.g., differently shaped, different dimensions, etc.) or without any upwardly protruding portions.

By way of background, 15 Watt (15 W) automotive wireless chargers operate at high z gap distances that may result in poor coupling factors (k). The coupling factor indicates how much magnetic flux from the transmit (Tx) coil reaches the receive (Rx) coil. The magnetic flux interaction takes place in the air gap between the Tx and Rx coils. The value of the coupling factor ranges from 0 to 1. A coupling factor of 0 refers to decoupled coils. A coupling factor of 1 refers to a perfect coupling in which all magnetic flux from the transmitter coil penetrates to the receiver coil.

As just noted, the wireless charging module 100 includes upwardly protruding portions 148 along the wireless charging module's upper housing portion 104. The upwardly protruding portions 148 are configured to create airflow channels between adjacent pairs of the upwardly protruding portions 148 underneath a mobile device that has been placed atop the upwardly protruding portions 148 for wireless charging. By elevating the mobile device above the upper housing portion 104 to create the airflow channels underneath the mobile device, the upwardly protruding portions 148 increase the z-gap distance between the receive (Rx) coil of the mobile device and the transmit (Tx) coils of the wireless charging module 100. Accordingly, the upwardly protruding portions 148 thus provide a counterintuitive way of providing additional cooling for the mobile device. And the additional cooling may advantageously allow for wireless charging of the mobile device at a higher power level without overheating of the mobile device. This exemplary configuration for the wireless charging module may also provide a generally symmetrical airflow across at least one surface of the mobile device along opposite sides of a receive coil of the mobile device while avoiding interference with the transmit (Tx) coils of the wireless charging module 100.

As shown in FIG. 3, the upper and lower housing portions 104, 108 cooperatively define the air passageways or ducts 136, 140 in communication with the air inlets or vents 120, 124 of the upper housing portion 104 and the air outlets or vents 128, 132 of the lower housing portion 108. In this exemplary embodiment, the upper housing portion 104 includes or integrally defines upper ducts that engage with lower ducts included within or integrally defined by the lower housing portion 108.

With continued reference to FIG. 1, the upper housing portion 104 also includes a plurality of vents or outlets 152 in communication with a side air passageway or side duct.

Air is routable through the side duct to the outlets 152 from which the air is dischargeable to thereafter flow along at least one surface of a mobile device that has been placed along the upper housing portion 104 for wireless charging. In this exemplary embodiment, the side duct is formed by a combination of an upper or top channel 156 of the upper housing portion 104 and a lower or bottom channel 160 of the lower housing portion 108.

In this exemplary embodiment, the side duct is positioned substantially centrally along the upper surface portion 104 above the first and second coil modules 112, 116. The side duct is intended to provide cool air alongside two mobile devices placed along opposite sides of the side duct. Accordingly, outlets are along each of the opposite sides of the side duct 104 for discharging air alongside each of the two mobile devices. In alternative embodiments including a single wireless charger (instead of the dual wireless charger design shown in FIG. 1), the side duct could be positioned along or adjacent a side edge of the upper housing portion. Depending on the configuration of the upper housing portion or top panel 104, the side duct may have a simpler or more complex shape so as to position cool air along one or more sides of a mobile device.

The wireless charging module 100 further comprises a substrate 164 (FIG. 1) between the first and second coil modules 112, 116 and the upper housing portion 104. The substrate 164 includes at least one slot 168 aligned with the upper channel 156 and the lower channel 160 such that the substrate 164 does not obstruct the side duct. The substrate 164 also includes four apertures or openings 168, 172 aligned with the four air inlets or vents 120, 124 of the upper housing portion 104. The substrate's apertures or openings 168, 172 allow the air inlets or vents 120, 124 of the upper housing portion 104 to communicate with the ducts 136, 140 provided in (e.g., integrally defined by, injection molded, etc.) the lower housing portion 108 without obstruction from the substrate 160.

Also shown in FIG. 1 is a valve 176 configured to provide access to cool air that can flow through the side duct to the outlets or vents 152 along the upper housing portion 104. The cool air can be provided by the vehicle's air conditioning (AC) system if the system is turned on and can be controlled by the valve 176. In general, the valve 176 should be sufficient if the AC system has sufficient pressure to force cool air through the outlets or vents 152 along the upper housing portion 104 of the wireless charging module 100. Conversely, if the pressure differential is insufficient, then the valve 176 can be replaced by a fan that creates sufficient pressure differential to force cool air out of the one or more outlets or vents 152.

As shown in FIGS. 1, 2, and 3, each coil module 112, 116 includes three transmit (Tx) coils placed in an overlapping arrangement in which at least a portion of a first coil overlaps at least a portion of a second coil and at least a portion of the second coil overlaps at least a portion of a third coil. In this example, the three transmit coils are overlappingly arranged in such a way to resemble a scaly structure (e.g., transmit coils resemble scales lying over each other, etc.) or a structure resembling three fallen dominoes. But the transmit coils and coil topologies of the coil modules 112, 116 are examples only. Alternative embodiments may include wireless charging modules configured differently, e.g., with more or less than two coil modules (e.g., a single coil module, etc.), with one or more coil modules with different coil topologies (e.g., non-overlapping transmit coils, etc.), with one or more coil modules with more or less than three transmit coils, with differently configured transmit coils (e.g., more or less coil windings, etc.), etc.

For example, another exemplary embodiment of a wireless charging module may include at least one transmit coil(s) having a center opening devoid of material such that the center opening remains open to allow air flow through the center of the transmit coil(s) for additional cooling.

By way of further example, another exemplary embodiment of a wireless charging module includes a single coil module for wirelessly charging a single mobile device. In such exemplary embodiment, the cooling features disclosed herein are configured for cooling a single mobile device that is being charged by the wireless charging module. For example, the upper housing portion includes two air inlets or vents spaced apart so as to be positioned adjacent opposite first and second end portions of the single mobile device. The lower housing portion includes a single air outlet or vent in communication with the two air inlets or vents of the upper housing portion via ductwork (e.g., one or more air passageways or ducts, etc.) provided in (e.g., integrally defined by, etc.) the housing. The wireless charging module also includes one fan in communication with the ductwork via the single air outlet or vent of the lower housing portion. The fan is operable for generating an air flow into the two air inlets or vents of the upper housing portion through the ductwork around at least a portion of the single coil module to the single air outlet or vent of the lower housing portion.

Figure 4:
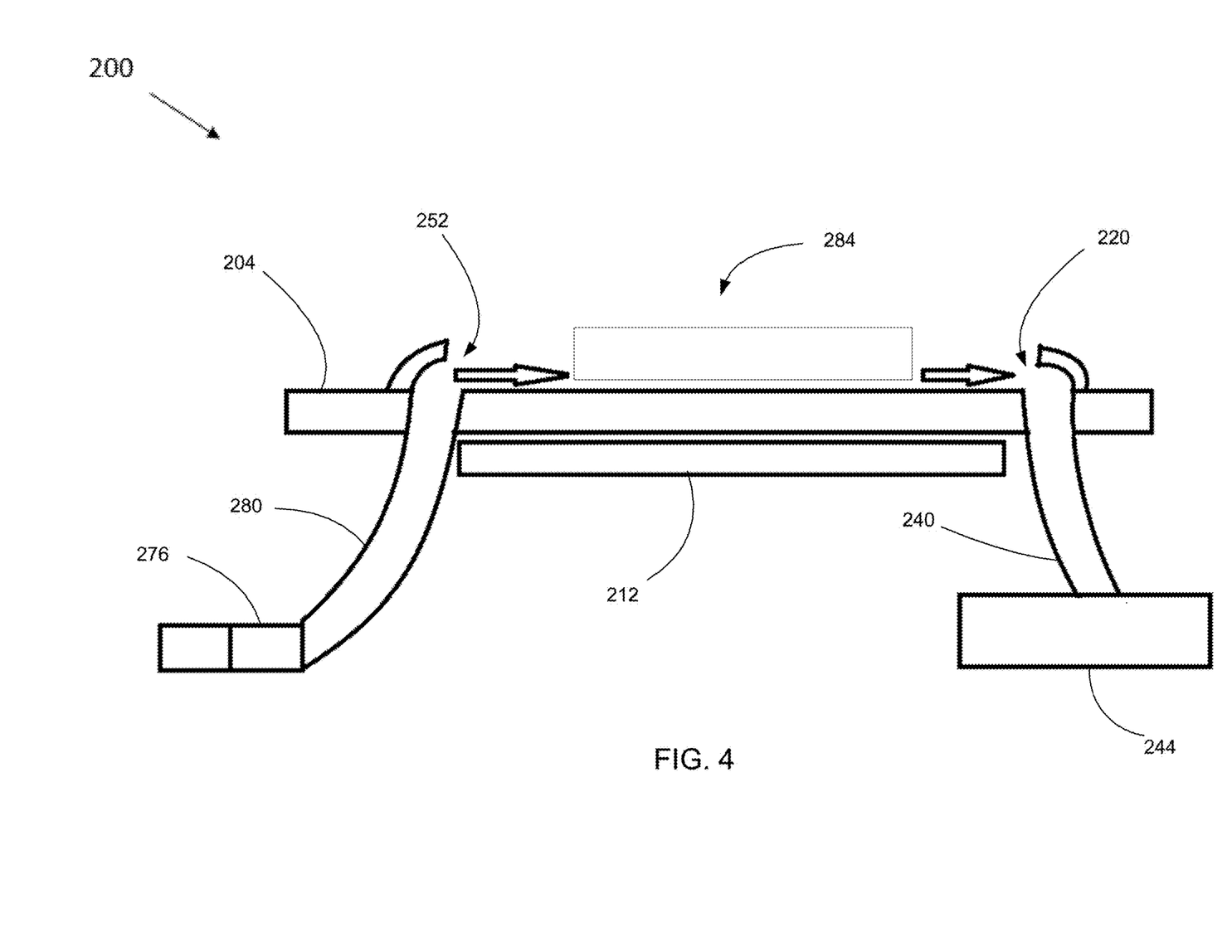
FIG. 4 is a schematic diagram of a wireless charging module including a valve and fan configured to provide access to cool air according to an exemplary embodiment of the present disclosure.

FIG. 4 is a schematic diagram of a wireless charging module 200 wherein an additional cooling source is provided. The cool air can be provided by the vehicle's air conditioning (AC) system if the system is turned on and can be controlled by a valve or fan. In general, a valve 276 should be sufficient if the AC system has sufficient pressure to force cool air through one or more outlets or vents 252 along the upper surface portion 204 of the wireless charging module 200. Conversely, if the pressure differential is insufficient, then the valve can be replaced by a fan that creates sufficient pressure differential to force cool air out of the one or more outlets or vents 252.

As shown in FIG. 4, the wireless charging module 200 includes the valve 276 and the fan 244 to provide access to cool air. In this exemplary embodiment, cool air is routed through the side air passageway or duct 280 within the wireless charging module to the outlet or vent 252 of the upper housing portion 204. Cool air discharged from the outlet or vent 252 is directed, deflected, or otherwise routed to flow along a surface of a mobile device 284 placed on the upper housing portion 204. After the cool air flows along the surface of the mobile device 284, the air is routed, flows, or otherwise makes its way (e.g., drawn or pulled via the fan 244, etc.) to an inlet or vent 220 of the upper housing portion 204 into another air passageway or duct 240 within the wireless charging module 200. The fan 244 is operable for drawing or pulling air into the inlet or vent 220 and through the duct 240.

The cool air can be provided with or without the fan 244. And the fan 244 can pull air into the inlet or vent 220 through the duct 240 with or without the valve 276 allowing cool air to exit the wireless charging module 200 via one or more outlets or vents.

In an exemplary embodiment, a temperature sensor can be provided that is configured to be operable for determining a temperature of the mobile device 284 that has been placed along the upper housing portion 204 for wireless charging. In this example, the wireless charging module 200 may be configured to determine whether the temperature of the mobile device 284 is increasing and needs additional cooling. And in response to determining that the mobile device is increasing and needs additional cooling, the wireless charging module may to engage the valve 276 to thereby route air from the cool air supply through the duct 280 to the outlet or vent 252 from which the air is discharged to flow along at least one surface of the mobile device 284. Additionally, or alternatively, the wireless charging module 200 may be configured to engage either or both the valve 276 and the fan 244 based on one or more predetermined conditions, to thereby route air from the cool air supply through the duct 280 to the outlet or vent 252 from which the air is discharged to flow along at least one surface of the mobile device 284. The one or more predetermined conditions may include an excess temperature alert received from the mobile device; and/or a determination that additional cooling is desirable based on an amount of power being provided to a receive coil of the mobile device.

Accordingly, disclosed herein are exemplary embodiments of wireless charging modules configured to include cooling features. Also disclosed are exemplary methods of operating a wireless charging module including cooling one or more coil modules of the wireless charging module and/or cooling one or more mobile devices placed on the wireless charging module for wireless charging.

In exemplary embodiments, a wireless charging module includes a housing configured to support at least one coil module therein. The housing includes an upper housing portion and a lower housing portion. The upper housing portion includes (e.g., integrally defines, etc.) at least one vent. The lower housing portion includes at least one vent. One or more air passageways or ducts are provided within (e.g., integrally defined by, injection molded ductwork within, etc.) the housing. The one or more ducts are in communication with the at least one vent of the upper housing portion and the at least one vent of the lower housing portion. An airflow path is defined from the at least one vent of the upper housing portion through the one or more ducts to the at least one vent of the lower housing portion for allowing an air flow internally within the housing generally around and/or adjacent at least a portion of the at least one coil module supported within the housing.

In exemplary embodiments, a plurality of air passageways or ducts are provided within the housing. First and second vents of the upper housing portion are in communication with the plurality of ducts. The first and second vents are spaced apart from each other along the upper housing portion so as to be respectively adjacent opposite first and second end portions of a mobile device when the mobile device is placed along the upper housing portion for wireless charging.

In exemplary embodiments, at least one fan is in communication with the one or more ducts via the at least one vent of the lower housing portion. The at least one fan is configured to be operable for generating an air flow into the at least one vent of the upper housing portion through the one or more ducts to the at least one vent of the lower housing portion.

In exemplary embodiments, the upper housing portion includes (e.g., integrally defines, etc.) a plurality of upwardly protruding portions spaced apart along the upper housing portion. The upwardly protruding portions are configured to allow air to pass underneath a mobile device that has been placed atop the upwardly protruding portions for wireless charging.

In exemplary embodiments, the upper housing portion includes (e.g., integrally defines, etc.) a plurality of ribs spaced apart along and upwardly protruding from the upper housing portion. The lower housing portion includes at least one air outlet. The upper housing portion includes first and second air inlets in communication with the one or more ducts. The first and second air inlets are spaced apart from each other along the upper housing portion so as to be respectively adjacent opposite first and second end portions of a mobile device that has been placed atop the ribs for wireless charging. The ribs are configured to allow air to pass underneath the mobile device and then be drawn into the first and second air inlets through the one or more ducts to the at least one air outlet of the lower housing portion. At least one fan may be in communication with the one or more ducts via the at least one air outlet of the lower housing portion. The at least one fan may be configured to be operable for drawing air from underneath the mobile device between pairs of adjacent ribs into the first and second air inlets through the one or more ducts to the at least one air outlet of the lower housing portion. The wireless charging module may be configured such that a generally symmetrical airflow is provided across at least one surface of the mobile device along opposite sides of a receive coil of the mobile device while avoiding interference with one or more transmit coils of the at least one coil module.

In exemplary embodiments, at least one outlet of the upper housing portion is configured to be selectively in communication with a cool air supply via the one or more ducts. Air from the cool air supply is routable through the one or more ducts to the at least one outlet of the upper housing portion from which the air is dischargeable to thereafter flow along at least one surface of a mobile device that has been placed along the upper housing portion for wireless charging. The upper housing portion may further include at least one inlet downstream from the at least one outlet. The at least one inlet may be configured for receiving air discharged from the at least one outlet after flowing along the at least one surface of the mobile device. At least one fan may be in communication with the at least one inlet via the one or more ducts. The at least one fan may be configured to be operable for drawing or pulling air into the at least one inlet. The wireless charging module may be configured to allow the at least one outlet to be selectively in communication with an air conditioning system of a vehicle in which the wireless charging module is being used. The cool air supply may include at least one fan in communication with the at least one outlet via the one or more ducts. Additionally, or alternatively, the at least one outlet may be in communication with at least one valve via the one or more ducts. The at least one valve may be configured to provide the at least one outlet with selective access to the cool air supply.

In exemplary embodiments, the wireless charging module further includes at least one temperature sensor configured to be operable for determining a temperature of the mobile device that has been placed along the upper housing portion for wireless charging. The wireless charging module is configured to: determine whether the temperature of the mobile device is increasing and needs additional cooling; and in response to determining that the mobile device is increasing and needs additional cooling, route air from the cool air supply through the one or more ducts to the at least one outlet from which the air is discharged to flow along at least one surface of the mobile device.

In exemplary embodiments, the wireless charging module is configured to, based on one or more predetermined conditions, route air from the cool air supply through the one or more ducts to the at least one outlet from which the air is discharged to flow along at least one surface of a mobile device that has been placed along the upper housing portion for wireless charging. The one or more predetermined conditions may include an excess temperature alert received from the mobile device and/or a determination that additional cooling is desirable based on an amount of power being provided to a receive coil of the mobile device.

In exemplary embodiments, the upper and lower housing portions are configured to be coupled together such that an interior compartment for the at least one coil module is cooperatively defined between the upper and lower housing portions and such that the one or more ducts are disposed generally around a least a portion of the at least one charging coil.

In exemplary embodiments, a substrate is between the at least one coil module and the upper housing portion. The substrate includes at least one aperture aligned with the at least one vent of the upper housing portion to thereby allow the at least one vent of the upper housing portion to communicate with the one or more ducts via the at least one aperture without obstruction from the substrate.

In exemplary embodiments, at least one side duct is in communication with at least one outlet of the upper housing portion. Air is routable through the at least one side duct to the at least one outlet from which the air is dischargeable to thereafter flow along at least one surface of a mobile device that has been placed along the upper housing portion for wireless charging. The at least one side duct may be cooperatively defined by an upper channel of the upper housing portion and a lower channel of the lower housing portion. A substrate may be disposed between the at least one coil module and the upper housing portion. The substrate may include at least one slot aligned with the upper channel and the lower channel such that the substrate does not obstruct the at least one side duct.

In exemplary embodiments, the housing is configured to support first and second coil modules therein that are operable for respectively charging first and second mobile devices when placed along the upper housing portion respectively above the first and second coil modules. At least one side duct is substantially centrally positioned along the upper housing portion above the first and second coil modules. The upper housing portion includes first and second outlets in communication with the at least one side duct. Air is routable through the at least one side duct to the first and second outlets from which the air is dischargeable to thereafter flow along surfaces of the respective first and second mobile devices that have been between placed along the upper housing portion respectively above the first and second coil modules and along opposite first and second sides of the at least one side duct.

In exemplary embodiments, the housing is configured to support first and second coil modules therein that are operable for respectively charging first and second mobile devices when placed along the upper housing portion respectively above the first and second coil modules. First and second air ducts are defined generally around and/or adjacent at least a portion of the first coil module supported within the housing. Third and fourth air ducts are defined generally around and/or adjacent at least a portion of the second coil module supported within the housing. First and second air inlets are spaced apart along the upper housing portion so as to be adjacent opposite end portions of the first mobile device when the first mobile device is placed along the upper housing portion above the first coil module. Third and fourth air inlets are spaced apart along the upper housing portion so as to be adjacent opposite end portions of the second mobile device when the second mobile device is placed along the upper housing portion above the second coil module. The lower housing portion includes first and second air outlets. The first air outlet is in communication with the first and second air inlets via the respective first and second air ducts. The second air outlet is in communication with the third and fourth air inlets via the respective third and fourth air ducts. A first fan is in communication with the first and second air ducts via the first air outlet of the bottom housing portion. The first fan is configured to be operable for generating an air flow into the first and second air inlets of the upper housing portion through the first and second air ducts generally around and/or adjacent the at least a portion of the first coil module supported within the housing to the first air outlet of the lower housing portion. A second fan is in communication with the third and fourth air ducts via the second air outlet of the bottom housing portion The second fan is configured to be operable for generating an air flow into the third and fourth air inlets of the upper housing portion through the third and fourth air ducts generally around and/or adjacent the at least a portion of the second coil module supported within the housing to the second air outlet of the lower housing portion.

Also disclosed are exemplary methods of operating a wireless charging module. In exemplary embodiments, a method includes providing a cooling airflow internally within a housing of a wireless charger module for cooling one or more coil modules of the wireless charging module and/or externally along the housing for cooling one or more mobile devices placed on the wireless charging module for wireless charging.

In exemplary embodiments, the method includes providing an air flow internally within the housing generally around and/or adjacent at least a portion of at least one coil module supported within the housing. The air flows along an airflow path defined from at least one vent of an upper housing portion through one or more air passageways or ducts providing within (e.g., integrally defined by, injection molded ductwork within, etc.) the housing to at least one vent of a lower housing portion.

In exemplary embodiment, the method includes generating an air flow, via at least one fan, into the at least one vent of the upper housing portion through the one or more ducts to the at least one vent of the lower housing portion.

In exemplary embodiments, the method includes providing the air flow into first and second vents of the upper housing portion that are in communication with a plurality of ducts within the housing. The first and second vents are spaced apart from each other along the upper housing portion so as to be respectively adjacent opposite first and second end portions of a mobile device when the mobile device is placed along the upper housing portion for wireless charging.

In exemplary embodiments, the method includes placing a mobile device atop upwardly protruding portions (e.g., spaced apart ribs, etc.) of the upper housing portion for wireless charging of the mobile device by the wireless charging module. The method also includes drawing or pulling air, via at least one fan, from underneath the mobile device into one or more air inlets of the upper housing portion through the one or more ducts within the housing to the one or more air outlets of the lower housing portion.

In exemplary embodiments, the method includes generating a generally symmetrical airflow across at least one surface of a mobile device along opposite sides of a receive coil of the mobile device while avoiding interference with one or more transmit coils of the at least one coil module of the wireless charging module.

In exemplary embodiments, the method includes routing air from a cool air supply (e.g., vehicle air conditioning system, fan, etc.) through the one or more ducts within the housing to at least one outlet of the upper housing portion from which the air is dischargeable to thereafter flow along at least one surface of a mobile device that has been placed along the upper housing portion for wireless charging by the wireless charging module. The method may further include drawing or pulling air, via a fan, into at least one inlet (downstream from the at least one outlet) and through the one or more ducts within the housing. The at least one inlet may be configured for receiving air discharged from the at least one outlet after flowing along the at least one surface of the mobile device.

In exemplary embodiments, the method includes sensing, via a temperature sensor, a temperature of a mobile device that has been placed along the upper housing portion for wireless charging by the wireless charging module. The method also includes determining whether the temperature of the mobile device is increasing and needs additional cooling. In response to determining that the mobile device is increasing and needs additional cooling, the method includes routing air from a cool air supply through the one or more ducts within the housing to at least one outlet from which the air is discharged to flow along at least one surface of the mobile device.

In exemplary embodiments, the method includes determining if on one or more predetermined conditions have been satisfied. In response to determining that the one or more predetermined conditions have been satisfied, the method includes routing air from a cool air supply through the one or more ducts within the housing to at least one outlet from which the air is discharged to flow along at least one surface of a mobile device that has been placed along the upper housing portion for wireless charging. The one or more predetermined conditions may include an excess temperature alert received from the mobile device and/or a determination that additional cooling is desirable based on an amount of power being provided to a receive coil of the mobile device.

In exemplary embodiments, method includes routing air through at least one side duct to at least one outlet from which the air is dischargeable to thereafter flow along at least one surface of a mobile device that has been placed along the upper housing portion for wireless charging by the wireless charging module. The at least one side duct may be cooperatively defined by an upper channel of the upper housing portion and a lower channel of the lower housing portion. The method may further includes positioning a substrate between the at least one coil module and the upper housing portion such that at least one slot of the substrate is aligned with the upper channel and the lower channel such that the substrate does not obstruct the at least one side duct.

In exemplary embodiments, the at least one side duct is substantially centrally positioned along the upper housing portion above first and second coil modules of the wireless charging module. And the method include routing air through the at least one side duct to first and second outlets from which the air is dischargeable to thereafter flow along surfaces of respective first and second mobile devices that have been between placed along the upper housing portion respectively above the first and second coil modules and along opposite first and second sides of the at least one side duct.

In exemplary embodiments, the method includes generating, via a first fan, an air flow into first and second air inlets of the upper housing portion through the first and second air passageways ducts within the housing generally around and/or adjacent at least a portion of a first coil module supported within the housing to a first air outlet of the lower housing portion. The method also includes generating, via a second fan, an air flow into third and fourth air inlets of the upper housing portion through third and fourth air passageways or ducts within the housing generally around and/or adjacent at least a portion of a second coil module supported within the housing to a second air outlet of the lower housing portion.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A wireless charging module comprising:
   a housing configured to support at least one coil module therein, the housing including an upper housing portion and a lower housing portion, the upper housing portion including at least one vent, the lower housing portion including at least one vent; and
   one or more ducts provided within the housing and in communication with the at least one vent of the upper housing portion and the at least one vent of the lower housing portion, whereby an airflow path is defined from the at least one vent of the upper housing portion through the one or more ducts to the at least one vent of the lower housing portion for allowing an air flow internally within the housing generally around and/or adjacent at least a portion of the at least one coil module supported within the housing; and
   a substrate between the at least one coil module and the upper housing portion, wherein the substrate includes at least one aperture aligned with the at least one vent of the upper housing portion to thereby allow the at least one vent of the upper housing portion to communicate with the one or more ducts via the at least one aperture without obstruction from the substrate.

2. The wireless charging module of claim 1, wherein:
   the one or more ducts comprise a plurality of ducts provided within the housing;
   the at least one vent of the upper housing portion comprises first and second vents in communication with the plurality of ducts; and
   the first and second vents are spaced apart from each other along the upper housing portion so as to be respectively adjacent opposite first and second end portions of a mobile device when the mobile device is placed along the upper housing portion for wireless charging.

3. The wireless charging module of claim 1, further comprising at least one fan in communication with the one or more ducts via the at least one vent of the lower housing portion, the at least one fan configured to be operable for generating an air flow into the at least one vent of the upper housing portion through the one or more ducts to the at least one vent of the lower housing portion.

4. The wireless charging module of claim 1, wherein the upper housing portion includes a plurality of upwardly protruding portions spaced apart along the upper housing portion, whereby the upwardly protruding portions are configured to allow air to pass underneath a mobile device that has been placed atop the upwardly protruding portions for wireless charging.

5. The wireless charging module of claim 1, wherein:
   the upper housing portion includes a plurality of ribs spaced apart along and upwardly protruding from the upper housing portion;
   the at least one vent of the lower housing portion comprises at least one air outlet;
   the at least one vent of the upper housing portion comprises first and second air inlets in communication with the one or more ducts, the first and second air inlets spaced apart from each other along the upper housing portion so as to be respectively adjacent opposite first and second end portions of a mobile device that has been placed atop the ribs for wireless charging; and
   the ribs are configured to allow air to pass underneath the mobile device and then be drawn into the first and second air inlets through the one or more ducts to the at least one air outlet of the lower housing portion.

6. The wireless charging module of claim 5, wherein:
   the wireless charging module further comprises at least one fan in communication with the one or more ducts via the at least one air outlet of the lower housing portion; and
   the at least one fan is configured to be operable for drawing air from underneath the mobile device between pairs of adjacent ribs into the first and second air inlets through the one or more ducts to the at least one air outlet of the lower housing portion.

7. The wireless charging module of claim 6, wherein the wireless charging module is configured such that a generally symmetrical airflow is provided across at least one surface of the mobile device along opposite sides of a receive coil of the mobile device while avoiding interference with one or more transmit coils of the at least one coil module.

8. The wireless charging module of claim 1, wherein the at least one vent of the upper housing portion comprises at least one outlet configured to be in communication with a cool air supply via the one or more ducts, whereby air from the cool air supply is routable through the one or more ducts to the at least one outlet of the upper housing portion from which the air is dischargeable, wherein, in operation, the air can flow along at least one surface of a mobile device that has been placed along the upper housing portion for wireless charging.

9. The wireless charging module of claim 8, wherein the at least one vent of the upper housing portion further comprises at least one inlet downstream from the at least one outlet, whereby the at least one inlet is configured for receiving air discharged from the at least one outlet after flowing along the at least one surface of the mobile device.

10. The wireless charging module of claim 9, further comprising at least one fan in communication with the at least one inlet via the one or more ducts, whereby the at least one fan is configured to be operable for drawing or pulling air into the at least one inlet.

11. The wireless charging module of claim 8, wherein the wireless charging module is configured to allow the at least one outlet to be selectively in communication with an air conditioning system of a vehicle in which the wireless charging module is being used.

12. The wireless charging module of claim 8, wherein:
    the cool air supply comprises at least one fan in communication with the at least one outlet via the one or more ducts; and/or
    the at least one outlet is in communication with at least one valve via the one or more ducts, the at least one valve configured to provide the at least one outlet with selective access to the cool air supply.

13. The wireless charging module of claim 8, wherein:
the wireless charging module further comprises at least one temperature sensor configured to be operable for determining a temperature of the mobile device that has been placed along the upper housing portion for wireless charging; and
the wireless charging module is configured to:
determine whether the temperature of the mobile device is increasing and needs additional cooling; and
in response to determining that the mobile device is increasing and needs additional cooling, route air from the cool air supply through the one or more ducts to the at least one outlet from which the air is discharged to flow along at least one surface of the mobile device.

14. The wireless charging module of claim 8, wherein the wireless charging module is configured to, based on one or more predetermined conditions, route air from the cool air supply through the one or more ducts to the at least one outlet from which the air is discharged to flow along at least one surface of a mobile device that has been placed along the upper housing portion for wireless charging.

15. The wireless charging module of claim 14, wherein the one or more predetermined conditions include:
an excess temperature alert received from the mobile device; and/or
a determination that additional cooling is desirable based on an amount of power being provided to a receive coil of the mobile device.

16. The wireless charging module of claim 1, wherein the upper and lower housing portions are configured to be coupled together such that an interior compartment for the at least one coil module is cooperatively defined between the upper and lower housing portions and such that the one or more ducts are disposed generally around a least a portion of the at least one charging coil.

17. The wireless charging module of claim 1, wherein:
the at least one vent of the upper housing portion comprises at least one outlet; and
the one or more ducts comprises at least one side duct in communication with the at least one outlet, whereby air is routable through the at least one side duct to the at least one outlet from which the air is dischargeable to thereafter flow along at least one surface of a mobile device that has been placed along the upper housing portion for wireless charging.

18. The wireless charging module of claim 17, wherein:
the at least one side duct is cooperatively defined by an upper channel of the upper housing portion and a lower channel of the lower housing portion;
the wireless charging module further comprises a substrate between the at least one coil module and the upper housing portion; and
the substrate includes at least one slot aligned with the upper channel and the lower channel such that the substrate does not obstruct the at least one side duct.

19. The wireless charging module of claim 1, wherein:
the housing is configured to support first and second coil modules therein that are operable for respectively charging first and second mobile devices when placed along the upper housing portion respectively above the first and second coil modules;
the one or more ducts comprises at least one side duct substantially centrally positioned along the upper housing portion above the first and second coil modules; and
the at least one vent of the upper housing portion comprises first and second outlets in communication with the at least one side duct;
whereby air is routable through the at least one side duct to the first and second outlets from which the air is dischargeable to thereafter flow along surfaces of the respective first and second mobile devices that have been between placed along the upper housing portion respectively above the first and second coil modules and along opposite first and second sides of the at least one side duct.

20. The wireless charging module of claim 1, wherein:
the housing is configured to support first and second coil modules therein that are operable for respectively charging first and second mobile devices when placed along the upper housing portion respectively above the first and second coil modules;
the one or more ducts comprises:
first and second air ducts defined generally around and/or adjacent at least a portion of the first coil module supported within the housing; and
third and fourth air ducts defined generally around and/or adjacent at least a portion of the second coil module supported within the housing;
the at least one vent of the upper housing portion comprises:
first and second air inlets spaced apart along the upper housing portion so as to be adjacent opposite end portions of the first mobile device when the first mobile device is placed along the upper housing portion above the first coil module; and
third and fourth air inlets spaced apart along the upper housing portion so as to be adjacent opposite end portions of the second mobile device when the second mobile device is placed along the upper housing portion above the second coil module;
the at least one vent of the lower housing portion comprises:
a first air outlet in communication with the first and second air inlets via the respective first and second air ducts;
a second air outlet in communication with the third and fourth air inlets via the respective third and fourth air ducts;
the wireless charging module further comprises:
a first fan in communication with the first and second air ducts via the first air outlet of the bottom housing portion, the first fan configured to be operable for generating an
air flow into the first and second air inlets of the upper housing portion through the first and second air ducts generally around and/or adjacent the at least a portion of the first coil module supported within the housing to the first air outlet of the lower housing portion; and
a second fan in communication with the third and fourth air ducts via the second air outlet of the bottom housing portion, the second fan configured to be operable for generating an air flow into the third and fourth air inlets of the upper housing portion through the third and fourth air ducts generally around and/or adjacent the at least a portion of the second coil module supported within the housing to the second air outlet of the lower housing portion.

* * * * *